US009544711B2

United States Patent
Kim et al.

(10) Patent No.: US 9,544,711 B2
(45) Date of Patent: Jan. 10, 2017

(54) MTC MONITORING METHOD AND NETWORK NODE

(71) Applicant: LG ELECTRONICS INC., Seoul (KR)

(72) Inventors: Hyunsook Kim, Seoul (KR); Jaehyun Kim, Seoul (KR); Laeyoung Kim, Seoul (KR); Taehyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/438,530

(22) PCT Filed: Aug. 5, 2013

(86) PCT No.: PCT/KR2013/007022
§ 371 (c)(1),
(2) Date: Apr. 24, 2015

(87) PCT Pub. No.: WO2014/065492
PCT Pub. Date: May 1, 2014

(65) Prior Publication Data
US 2015/0289078 A1 Oct. 8, 2015

Related U.S. Application Data

(60) Provisional application No. 61/720,979, filed on Oct. 31, 2012, provisional application No. 61/718,694, filed on Oct. 25, 2012.

(51) Int. Cl.
*H04W 4/00* (2009.01)
*H04W 8/02* (2009.01)

(52) U.S. Cl.
CPC ............... *H04W 4/005* (2013.01); *H04W 8/02* (2013.01)

(58) Field of Classification Search
CPC ...... H04W 92/02; H04W 88/00; H04W 88/02; H04W 76/02; H04W 4/005; H04W 8/02
USPC .............................................. 455/422.1–425
See application file for complete search history.

(56) References Cited

U.S. PATENT DOCUMENTS

| 8,626,154 | B1 * | 1/2014 | Oroskar | .................. H04W 8/02 |
| | | | | 455/432.1 |
| 9,100,771 | B2 * | 8/2015 | Li | .......................... H04W 4/005 |
| 9,210,679 | B2 * | 12/2015 | Kim | ....................... H04W 60/06 |
| 9,300,480 | B2 * | 3/2016 | Kim | ........................ H04L 41/06 |
| 2012/0106431 | A1 | 5/2012 | Wu et al. | |
| 2012/0207094 | A1 | 8/2012 | Liao | |

(Continued)

FOREIGN PATENT DOCUMENTS

JP 2012-170084 A 9/2012
KR 10-2011-0081750 A 7/2011

(Continued)

*Primary Examiner* — Sharad Rampuria
(74) *Attorney, Agent, or Firm* — Birch, Stewart, Kolasch & Birch, LLP

(57) ABSTRACT

The present specification provides a method for monitoring machine type communication (MTC). The method for monitoring MTC can comprise the steps of: receiving, by a new serving network node for monitoring, a context from a previous serving network node according to the movement of an MTC device; checking whether an indicator for the MTC monitoring is included in the context; and requesting for data related to an MTC monitoring event from another network entity on the basis of the indicator for the MTC monitoring which is included in the context and acquiring the same.

15 Claims, 12 Drawing Sheets

(56) References Cited

U.S. PATENT DOCUMENTS

| | | | | |
|---|---|---|---|---|
| 2012/0264451 A1* | 10/2012 | Kim | ........................ | H04L 41/06 |
| | | | | 455/456.1 |
| 2013/0021970 A1* | 1/2013 | Lei | ........................ | H04W 4/005 |
| | | | | 370/328 |
| 2013/0028097 A1* | 1/2013 | Barrett | .................... | H04W 4/20 |
| | | | | 370/241 |
| 2013/0128777 A1* | 5/2013 | Garcia Azorero | .... | H04W 4/005 |
| | | | | 370/259 |
| 2013/0265937 A1* | 10/2013 | Jain | ........................ | H04W 4/005 |
| | | | | 370/328 |
| 2014/0029515 A1* | 1/2014 | Arkko | ................. | H04W 76/022 |
| | | | | 370/328 |
| 2014/0092808 A1* | 4/2014 | Jain | ........................ | H04L 5/0055 |
| | | | | 370/328 |
| 2016/0037450 A1* | 2/2016 | Richards | ........... | H04W 52/0209 |
| | | | | 370/311 |

FOREIGN PATENT DOCUMENTS

| | | |
|---|---|---|
| KR | 10-2012-0037988 A | 4/2012 |
| KR | 10-2012-0098899 A | 9/2012 |
| KR | 10-2012-0112752 A | 10/2012 |
| WO | WO 2011/006437 A1 | 1/2011 |
| WO | WO 2011/082538 A1 | 7/2011 |
| WO | WO 2011/087826 A1 | 7/2011 |

\* cited by examiner

MTC MONITORING METHOD AND NETWORK NODE

CROSS REFERENCE TO RELATED APPLICATIONS

This application is the National Phase of PCT International Application No. PCT/KR2013/007022, filed on Aug. 5, 2013, which claims priority under 35 U.S.C. 119(e) to U.S. Provisional Application No. 61/718,694, filed on Oct. 25, 2012 and 61/720,979, filed on Oct. 31, 2012, all of which are hereby expressly incorporated by reference into the present application.

BACKGROUND OF THE INVENTION

Field of the Invention

The present invention relates to a Machine Type Communication (MTC) monitoring method.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 Shows the Configuration of an Evolved Mobile Communication Network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an Exemplary Diagram Showing the Architecture of a Common E-UTRAN and a Common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an Exemplary Diagram Showing the Structure of a Radio Interface Protocol in a Control Plane between UE and an eNodeB, and FIG. 4 is Another Exemplary Diagram Showing the Structure of a Radio Interface Protocol in a Control Plane Between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a Flowchart Illustrating a Random Access Process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 7 Shows a 3GPP Service Model for Supporting MTC.

A Machine Type Communication (MTC) device may be used in a mobile communication system. MTC implies communication between one machine and another machine or between a machine to a server, excluding a human intervention. A device used in this case is called the MTC device, and a server used in this case is called an MTC server. A service provided through the MTC device is distinguished from a communication service based on the human intervention, and may be applied to various ranges of services.

The aforementioned MTC device is a communication device for performing communication between one machine and another machine or between a machine and a server, and is not much different from a User Equipment (UE) with a human intervention, except that the human intervention is excluded. That is, the MTC device may correspond to the UE excluding the human intervention. However, in terms of excluding the human intervention, some problems may occur if a message transmission/reception method (e.g., a paging message transmission/reception method) of the UE with the human intervention is collectively applied to the MTC device.

To support the MTC, although it is defined that communication is achieved through a PS network in GSM/UMTS/EPS of the 3GPP standard, a method applicable also to a CS network is described in the present specification.

A UE used for the MTC (or an MTC UE) and an end-to-end application between MTC applications may use services provided by a 3GPP system and selective services provided by the MTC server. The 3GPP system may include transmission and communication services (including a 3GPP bearer service, an IMS, and an SMS) including various optimizations for facilitating the MTC. It is shown in FIG. 7 that the UE used for the MTC is connected to a 3GPP network (e.g., UTRAN, E-UTRAN, GERAN, I-WLAN, etc.) through an Um/Uu/LTE-Uu interface. The architecture of FIG. 7 includes various MTC models (e.g., a direct model, an indirect model, and a hybrid model).

Entities shown in FIG. 6 are now described.

In FIG. 6, an application server is a server on a network on which an MTC application is executed. The aforementioned various techniques for implementing the MTC applications may be applied to the MTC application server, and a detailed description thereof will be omitted. In addition, in FIG. 7, the MTC application server may access the MTC server through a reference point API, and a detailed description thereof will be omitted. Alternatively, the MTC application server may be collocated with the MTC server.

The MTC server (e.g., a Services Capability Server (SCS) shown in the figure) is a server on a network for managing an MTC UE, and may be connected to a 3GPP network to communicate with a UE used for MTC and nodes of PLMN.

An MTC-InterWorking Function (MTC-IWF) may control interworking between an MTC server and an operator core network, and may play a role of a proxy of an MTC action. To support the MTC indirect or hybrid model, one or more MTC-IWFs may exist in a Home PLMN (HPLMN). The MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication, etc.

An SMS-SC (Short Message Service-Service Center)/IP-SM-GW (Internet Protocol Short Message GateWay) may manage transmission/reception of a Short Message Service (SMS). The SMS-SC may relay a short message between a Short Message Entity (SME) (i.e., an entity for transmitting or receiving a short message) and a mobile station and may serve for a storing-and-delivering function. The IP-SM-GW may serve for a protocol interaction between an IP-based UE and the SMS-SC.

A CDF (Charging Data Function)/CGF (Charging Gateway Function) may perform an accounting related action.

An HLR/HSS may perform a function for storing subscriber information (e.g., IMSI, etc.), routing information, configuration information, etc., and for providing it to the MTC-IWF.

An MSC/SGSN/MME may perform a control function such as mobility management, authentication, resource allocation, etc., for network connection of the UE. Regarding triggering, a function for receiving a trigger indication from the MTC-IWF and for processing it in a form of a message provided to the MTC UE may be performed.

A GGSN (Gateway GPRS Support Node)/S-GW (Serving-Gateway)+P-GW (Packet Data Network-Gateway) may perform a function of a gateway which serves for connection of a core network and an external network.

Table 2 below is a summary of an important reference point in FIG. 7.

TABLE 2

| Reference point | Description |
| --- | --- |
| Tsms | It is the reference point used by an entity outside the 3GPP system to communicate with UEs used for MTC through an SMS. |
| Tsp | It is the reference point used by an entity outside the 3GPP system to communicate with the MTC-IWF related control plane signalling. |
| T4 | A reference point used by the MTC-IWF to route device trigger to the SMS-SC in the HPLMN. |
| T5a | A reference point used between the MTC-IWF and the serving SGSN. |
| T5b | A reference point used between the MTC-IWF and the serving MME. |
| T5c | A reference point used between the MTC-IWF and the serving MSC. |
| S6m | A reference point used by the MTC-IWF to interrrogate the HSS/HLR for E.164 MSISDN (Mobile Station International Subscriber Directory Number) or external identifier mapping to IMSI and gather UE reachability and configuration information. |

At least one of the reference points T5a, T5b, and T5c is referred to as T5.

Meanwhile, user plane communication with the MTC server in case of the indirect and hybrid model and communication with the MTC application in case of the direct and hybrid model may be performed by using the existing protocol through reference points Gi and SGi.

The 3GPP TS 23.682 document may be incorporated by reference for details of the description of FIG. 6.

FIG. 7 Shows an Example of a Service via an MTC Device.

The service via the MTC device may be classified into several types. For example, there is a service for collecting a variety of information by the MTC device.

Referring to FIG. 7, as an example of the aforementioned service, it is shown that a measuring service, a road information service, a user electronic device control service, etc., can be provided via the MTC device. Herein, when the MTC device collects measuring information, road traffic information, etc., and transmits it to an eNodeB, the eNodeB may transmit it to an MTC server, and an MTC user may use a provided service.

A 3GPP service model/system for supporting MTC may provide a monitoring function/service for managing the MTC device. For example, a 3GPP system may detect the following event and report the detected event to the MTC server, so that the MTC user is allowed to easily manage the MTC device.

However, when the MTC device moves as described above, the serving MME may be changed, and a technique for solving such a problem has not been proposed yet.

SUMMARY OF THE INVENTION

Accordingly, an aspect of the present specification is to provide a method of solving the above-mentioned problems.

To achieve the aforementioned purpose, the present specification is to provide a method of performing MTC (Machine Type Communication) monitoring. The method may comprise: receiving, by a new serving network node for monitoring, a context from a previous serving network node according to the movement of an MTC device; checking whether an indicator for the MTC monitoring is included in the context; and requesting for data related to an MTC monitoring event from another network entity on the basis of the indicator for the MTC monitoring which is included in the context and acquiring the same.

To achieve the aforementioned purpose, the present specification is to provide a MTC (Machine Type Communication) monitoring network node which may comprise: a transceiver configured to receive a context from a previous serving network node for monitoring related to an MTC device; and a processor configured to check whether an indicator for the MTC monitoring is included in the context. Here, the processor requests for data related to an MTC monitoring event from another network entity on the basis of the indicator for the MTC monitoring which is included in the context and acquiring the same.

It may be checked about whether there is a capability for performing the required MTC monitoring, on the basis of the indicator included in the context and regarding the MTC monitoring.

The context comprises one or more of: information regarding a monitoring progression status; a direct instruction for acquiring monitoring event related information; information related to the network entity capable of acquiring monitoring event related information; and information regarding a range of applying the monitoring.

If the monitoring is related to an accumulated statistical value, the context comprises a statistical value accumulated by the previous serving network node.

The MTC monitoring event related data comprises one or more of a field for configuring, activating, deactivating, or triggering a report delivery regarding a specific monitoring event, a monitoring event ID, a related parameter, a monitoring event priority, and a monitoring destination node.

The network nodes correspond to one or more of an MME (Mobility Management Entity) and an SGSN(Serving GPRS Support Node).

The different entity is an HSS (Home Subscriber Server), an HLR (Home Location Register), an SCS(Service Capability Sever), or an application server.

The context is received during any one of a TAU (Tracking Area Update) procedure, an RAU (Routing Area Update) procedure, and an attach procedure is performed.

According to an aspect of the present specification, monitoring can be persistently performed even if a network node for performing monitoring, e.g., an MME, is changed.

DESCRIPTION OF EXEMPLARY EMBODIMENTS

Figure 1:
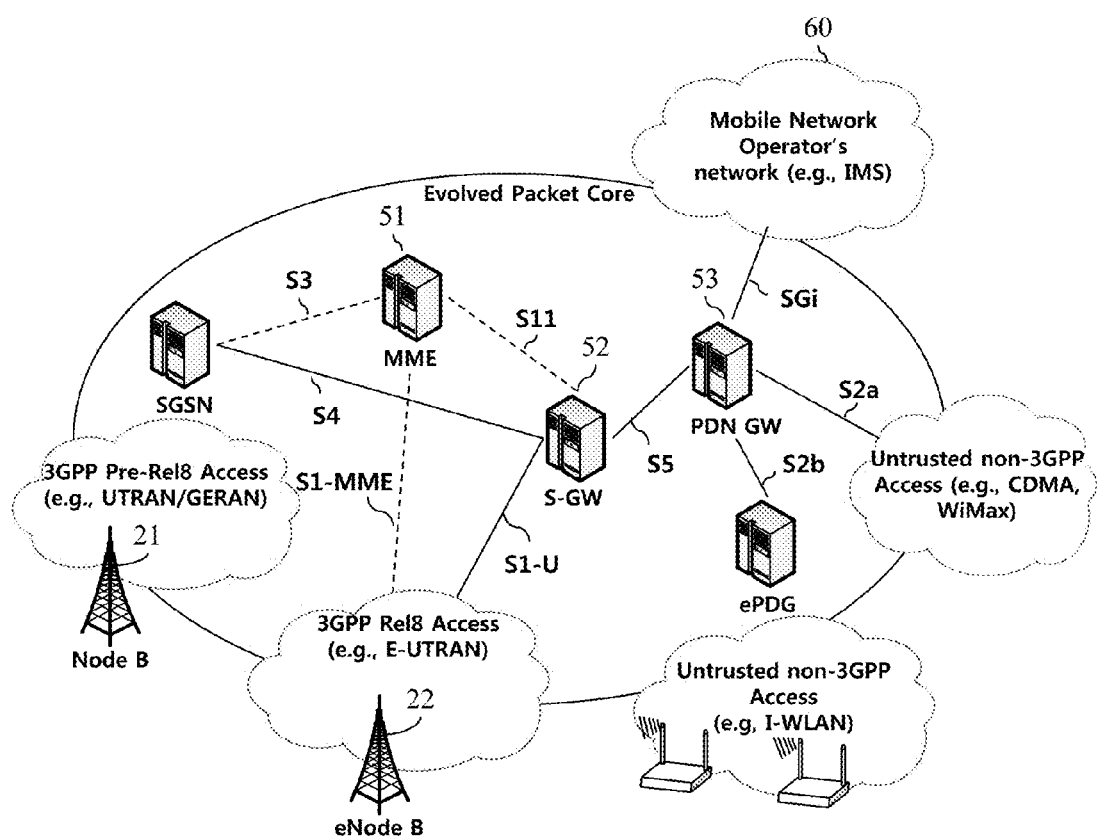
FIG. 1 shows the configuration of an evolved mobile communication network.
Figure 2:
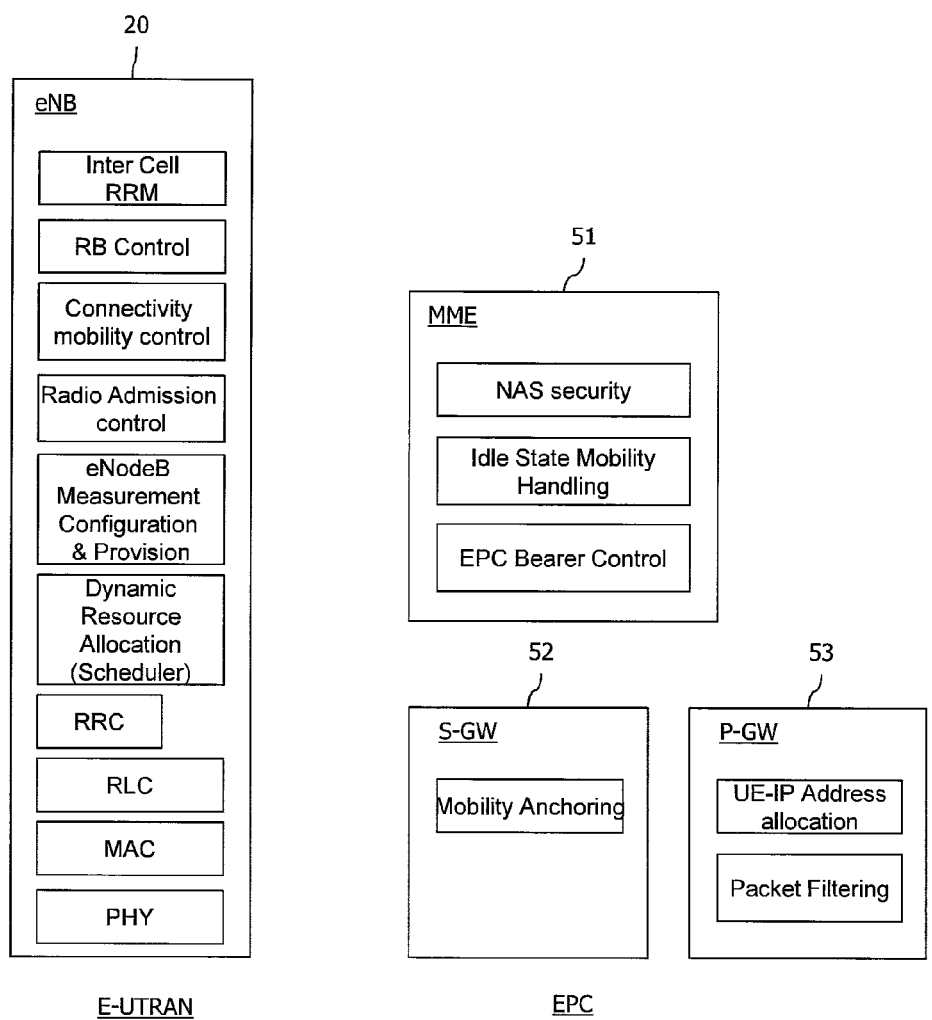
FIG. 2 is an exemplary diagram showing the architecture of a common E-UTRAN and a common EPC.
Figure 3:
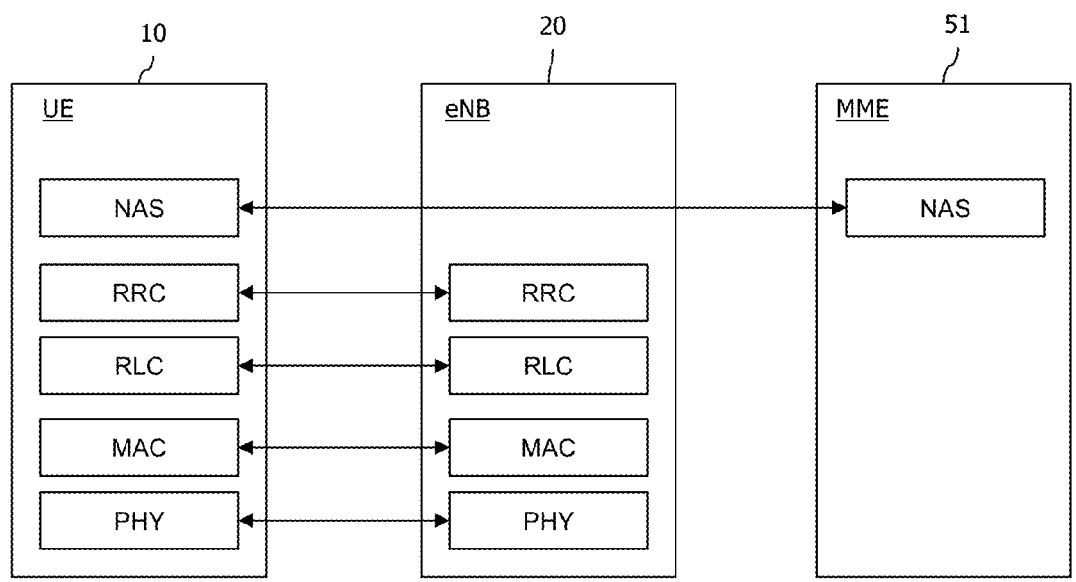
FIG. 3 is an exemplary diagram showing the structure of a radio interface protocol in a control plane between UE and an eNodeB.
Figure 4:
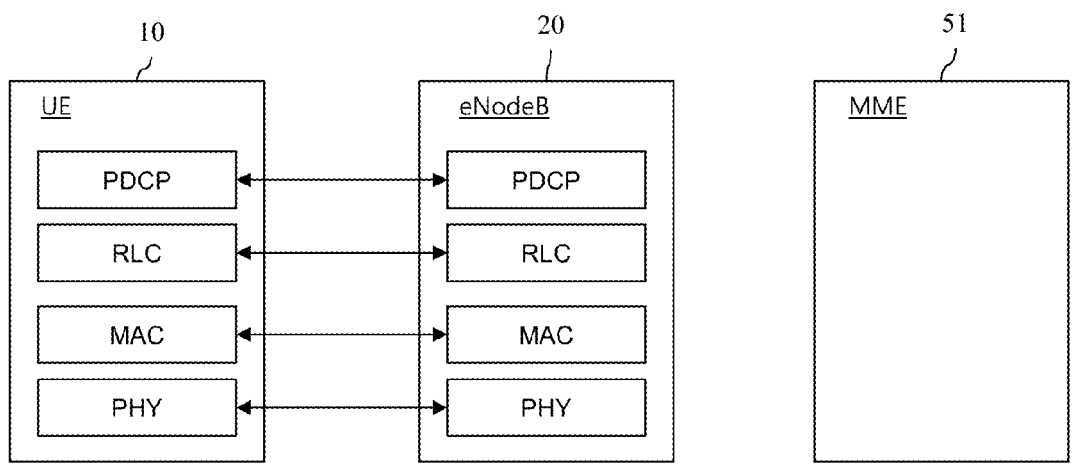
FIG. 4 is another exemplary diagram showing the structure of a radio interface protocol in a control plane between UE and an eNodeB.
Figure 5:
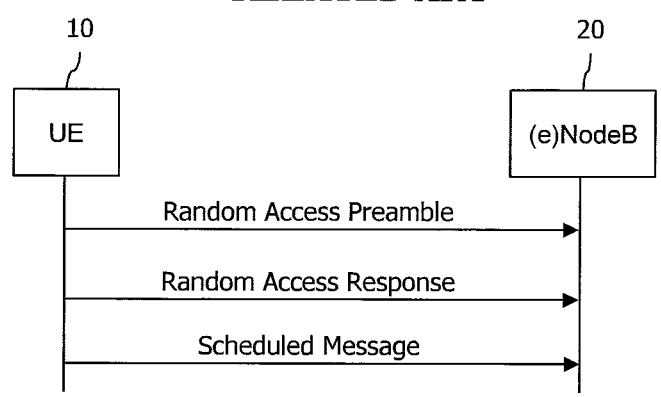
FIG. 5 is a flowchart illustrating a random access process in 3GPP LTE.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

NAS (Non-Access-Stratum): A higher stratum of a control plane between a UE and an MME. The NAS supports mobility management, session management, IP address management, etc., between the UE and the network Hereinafter, the present invention is described with reference to the accompanying drawings.

Figure 8:
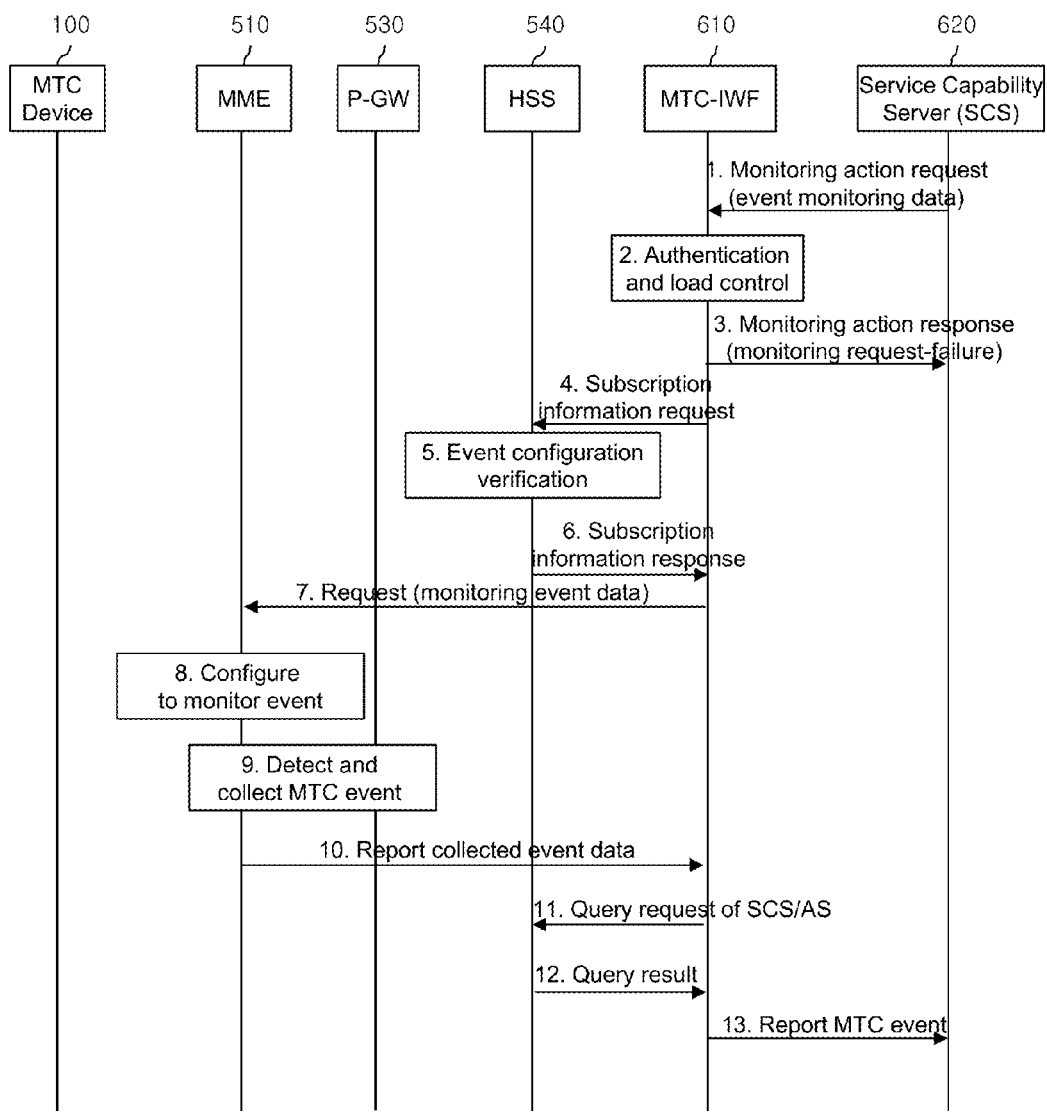
FIG. 8 is a signal flow diagram showing a process of performing MTC-related monitoring by a network node.

FIG. 8 is a Signal Flow Diagram Showing a Process of Performing MTC-Related Monitoring by a Network Node.

Referring to FIG. 8, the MTC-related monitoring may be requested to be performed by the network node. As such, the network node performs the monitoring because it is more effective than monitoring performed by the MTC device, for example, at the occurrence of an event for detaching an MTC device installed in things. The MTC monitoring includes activating monitoring of a specific event, detecting the event, and reporting the detected event to a verified user, e.g., an application. Upon detection of the event, the network node may instruct a special operation such as a specific behavior, e.g., an access restriction, an allocated resource reduction, etc.

Figure 6:
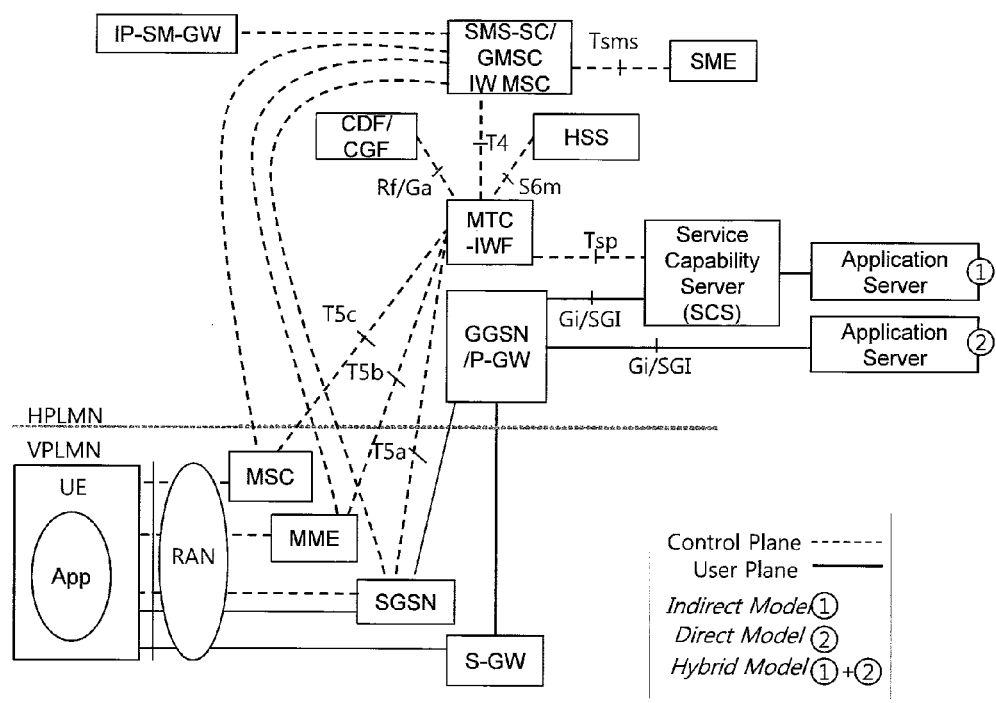
FIG. 6 illustrates the concept of a 3GPP service model for supporting MTC.
Figure 7:
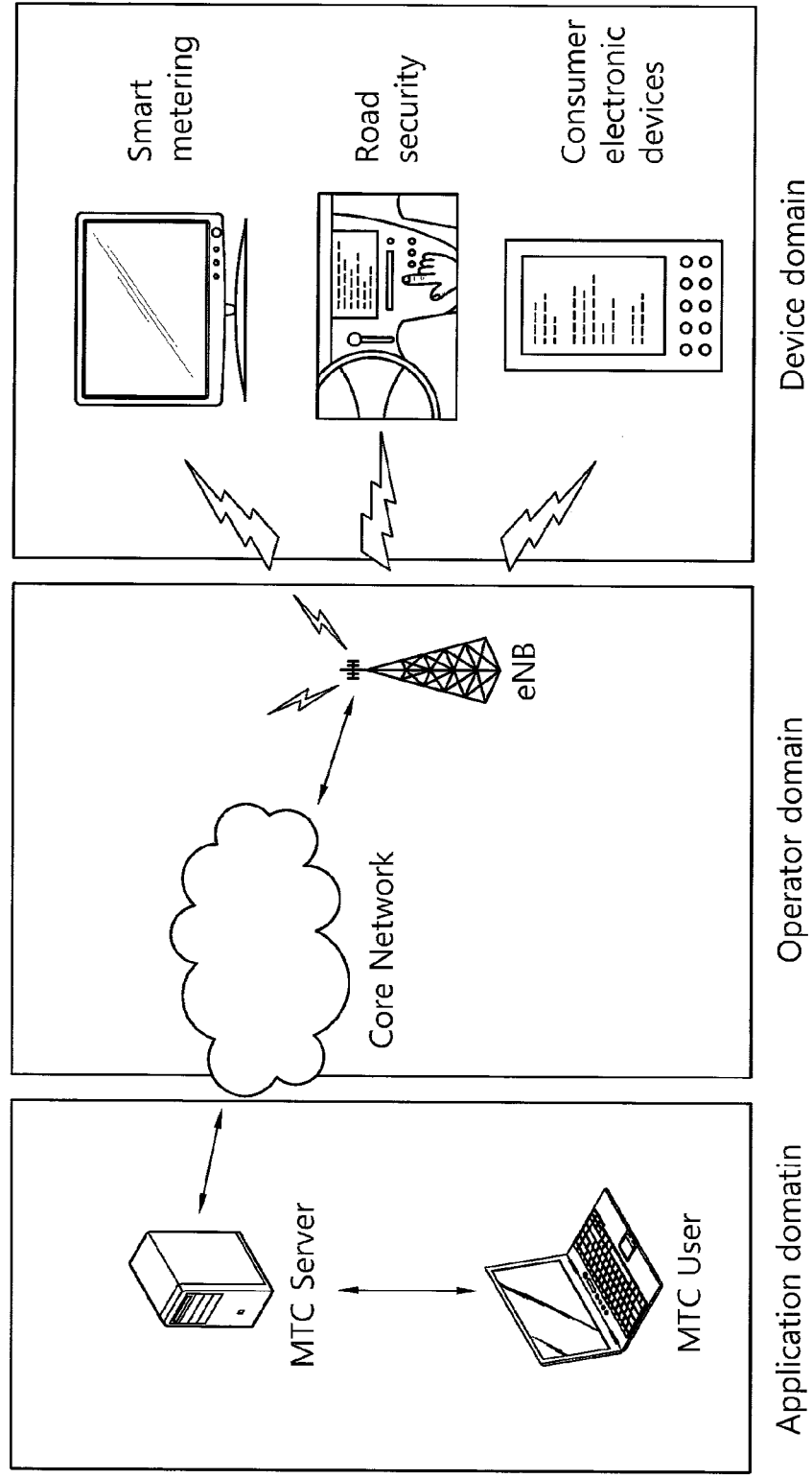
FIG. 7 illustrates an example of a service through an MTC device.

More specifically, referring to FIG. 8, a Services Capability Server (SCS) 620 transmits a monitoring action request message to an MTC-IWF 610. The monitoring action request may include event-related data to be monitored (also called monitoring event data). The monitoring event data may include an action type field for configuring, activating, deactivating, or triggering a report delivery regarding a specific monitoring event. In addition, the monitoring event data may further include a monitoring event ID and related parameter, a monitoring event priority, a monitoring destination node, etc. Herein, the MTC-IWF 610 as a device for performing an MTC interworking function is connected to an MMC 510 through a T5b interface as shown in FIG. 6, and is connected to the SCS 620 through a Tsp interface.

Upon reception of the request, the MTC-IWF 610 authenticates whether the SCS 620 has a right for the request, and checks whether the request of the SCS 620 is beyond a predetermined allocation criterion. If the checking result shows that the request of the SCS 620 is not acceptable, the MTC-IWF 610 transmits to the SCS 620 a monitoring action answer including a cause value indicating a failure cause of the request. Otherwise, if the checking result shows that the request of the SCS 620 is acceptable, the MTC-IWF 610 transmits to the SCS 620 a monitoring action answer including a value indicating a success of the request.

Subsequently, the MTC-IWF 610 transmits a subscriber information request message to a Home Subscription Server (HSS) 540 to check a monitoring configuration detail, e.g., a monitoring event ID. Herein, the monitoring event may be stored in the HSS 540 as the subscriber information.

The HSS 540 verifies the monitoring event information, and authenticates whether an MTC-IWF which attempts to configure a network node for the monitoring is acceptable. In addition, the HSS 540 delivers to the MTC-IWF 610 the subscriber information including the monitoring event related information.

The MTC-IWF 610 determines the network node for performing the monitoring, on the basis of information received from the SCS 620 and the HSS 540. If the network node for performing the monitoring is determined as the MME 510, the MTC-IWF 610 transmits to the MME 510 a request including monitoring event data.

Upon reception of the request including the monitoring event data, the MME 510 is configured to monitor the event.

Meanwhile, although the configured event may be monitored by the MME 510, it may also be monitored by a P-GW 530 according to a situation.

If the event is detected and collected through monitoring performed by the MME 510, a report for the collected event data may be transmitted to the MTC-IWF 610.

The MTC-IWF 610 checks whether a user who will receive the report is recorded in the subscription information.

If the information is not included in the report received from the MME 510, a query request of the SCS 620 or the application server is transmitted to the HSS 540. Upon reception of a query result from the HSS 540, a report for an MTC event is transmitted to the SCS 620 or application server of which the query is checked.

The method of performing the MTC-related monitoring by the network node has been described above with reference to FIG. 8. However, if the MTC device 100 moves as described above, the serving MME 510 may be changed according to a situation, but this cannot be handled using the conventional technique. Therefore, if the MTC device 100 moves and thus the MME 510 is changed, there is a problem in that a collection of monitoring is stopped.

Accordingly, methods of persistently performing MTC monitoring even if the serving MME 510 is changed will be described hereinafter with reference to the accompanying drawings.

Figure 9:
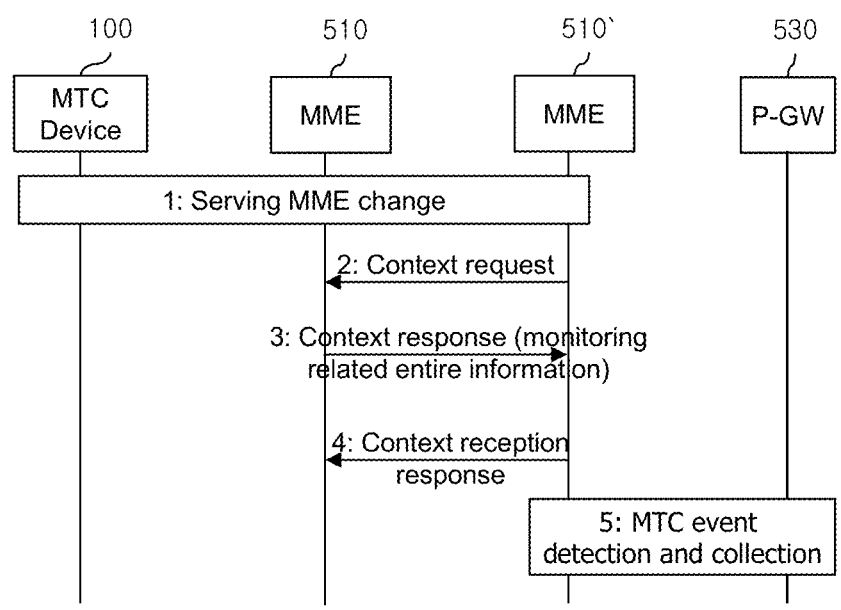
FIG. 9 shows a handling procedure for a case where a network node for performing MTC monitoring is changed.
Figure 10:
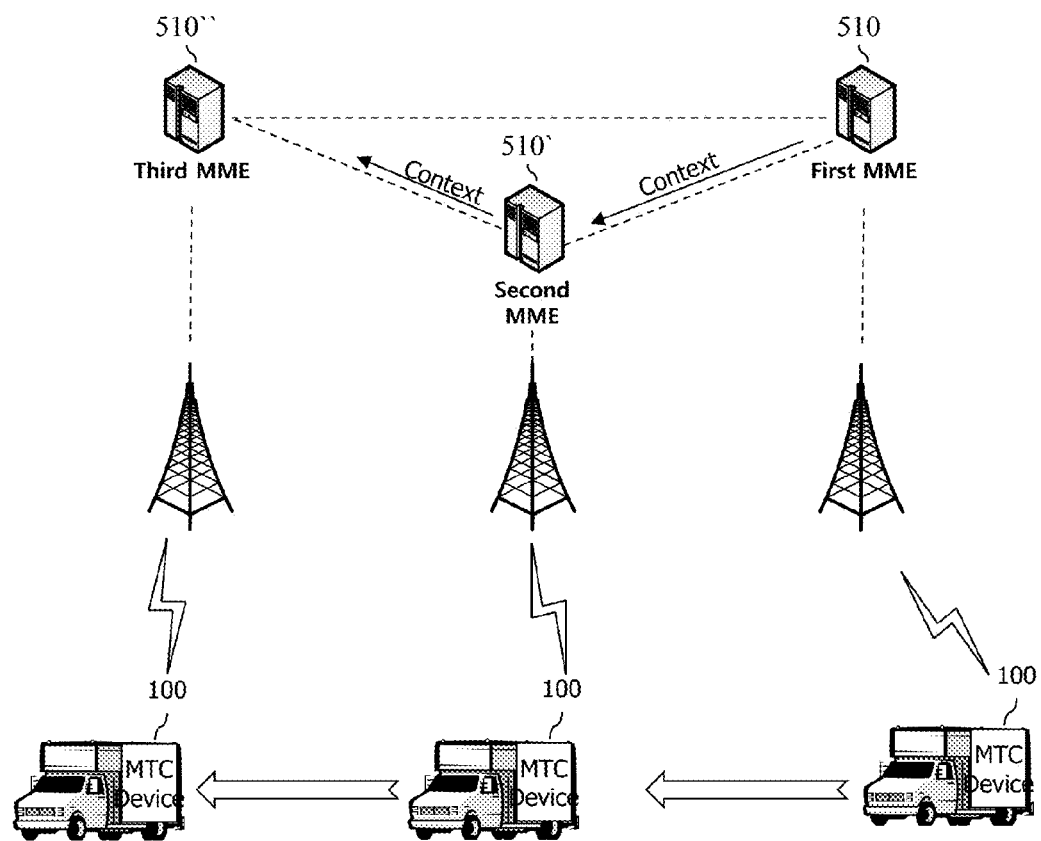
FIG. 10 shows an example of a problem which may occur in the procedure of FIG. 9.

FIG. 9 Shows a Handling Procedure for a Case Where a Network Node for Performing MTC Monitoring is Changed. FIG. 10 Shows an Example of a Problem Which May Occur in the Procedure of FIG. 9.

Referring to FIG. 9, during an MTC device 100 and a serving MME 510 perform MTC monitoring, a procedure such as a tracking area update, a routing area update, a handover, etc., is performed as the MTC device 100 moves. Accordingly, the serving MME 510 of the MTC device 100 may be changed to a different MME 510'.

In this case, the different MME 510' transmits a context request to the previous serving MME 510 so that MTC monitoring is continuously performed in the different MME 510'. Then, the previous serving MME 510 transmits a context by including entire information which has been referred by the previous serving MME 510 for monitoring. The entire information may include monitoring event data received in the step 7 of FIG. 8. In addition, the entire information includes entire data which has been recorded by the previous serving MME 510 while performing monitoring.

After transmitting a response for reception of the context to the previous serving MME 510, the different MME 510' may detect and collect an event on the basis of information included in the received context.

However, a method of transferring entire information for MTC monitoring to a different MME when an entity for performing the MTC monitoring, that is, an MME, is changed to the different MME, may be problematic in a specific situation of FIG. 10. In addition, the entire information for the MTC monitoring may also be problematic when a size of the entire information is significantly great.

For example, as can be seen from FIG. 10, it is assumed that an MTC device 100 is placed in a vehicle. It is also assumed that the vehicle moves at a high speed in a situation where an event for the MTC device 100 placed in the vehicle is monitored by a first MME 510. Accordingly, an entity for monitoring the MTC event is changed at a significantly high speed from the first MME 510 to a second MME 510' and to a third MME 510". Then, the first MME 510 starts to deliver to the second MME 510" a context including entire information for MTC monitoring at the request of the second MME 510'. However, a situation where the third MME 510" transmits a context request to the second MME 510' may occur even before the second MME 510' receives the context from the first MME 510. In this case, the second MME 510' may determine that the request of the third MME 510" is wrong, and thus may ignore the request.

In particular, such a problem may be more serious when capacity of the context including the entire information for the MTC monitoring is great. Therefore, to solve such a problem, a handling procedure according to an embodiment proposed in the present invention will be described with reference to FIG. 11.

Figure 11:
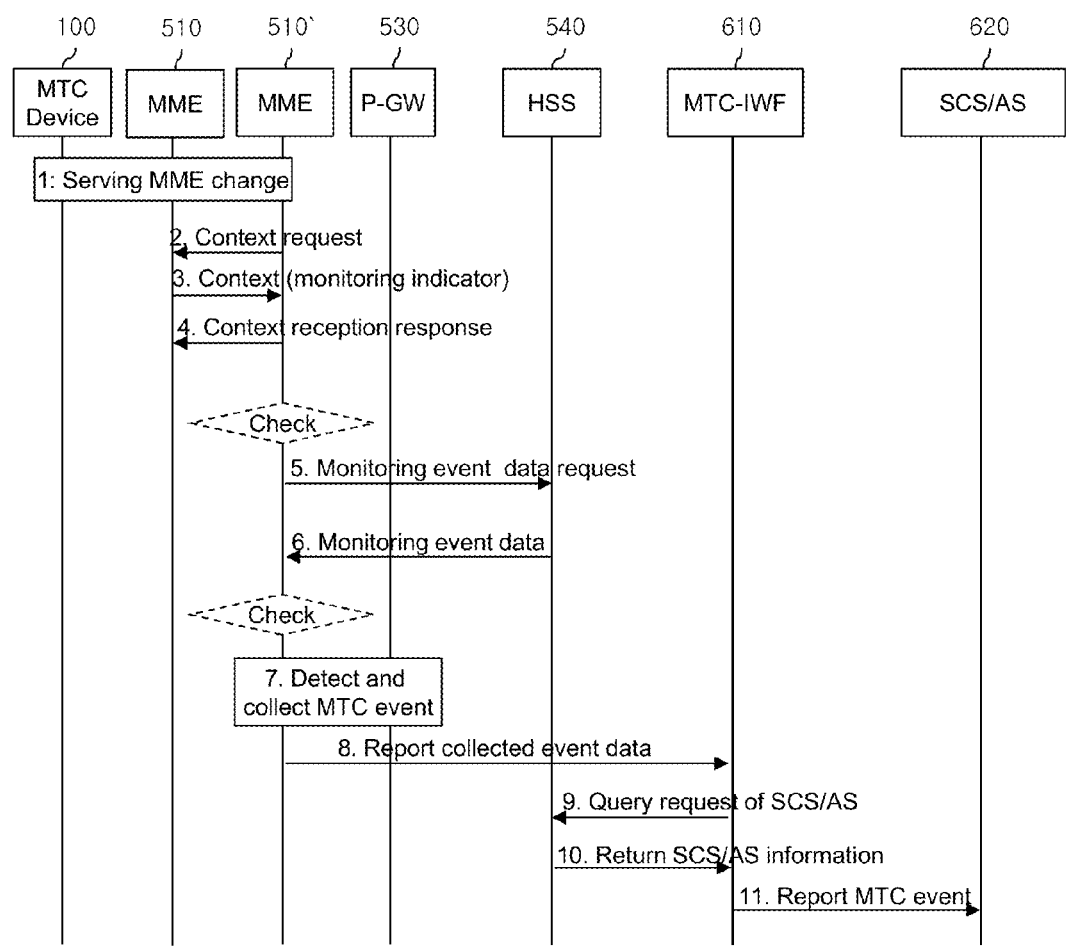
FIG. 11 is a flowchart showing a handling procedure for a case where a network node for performing MTC monitoring is changed according to an embodiment of the present invention.

FIG. 11 is a Flowchart Showing a Handling Procedure for a Case Where a Network Node for Performing MTC Monitoring is Changed According to an Embodiment of the Present Invention.

As can be seen from FIG. 11, according to an embodiment of the present invention, when an entity for performing MTC monitoring, that is, an MME, is changed to a different MME, a context including only minimum information related to the MTC monitoring, for example, an indicator, is delivered to the different MME.

The minimum information may include the following information.

Information regarding a monitoring progression status. That is, information indicating that monitoring is currently carried out or a monitoring service is currently carried out or information indicating that it is an MTC device requiring monitoring.

A direct instruction for acquiring monitoring event related information.

Information related to a network node capable of acquiring monitoring event related information.

Information regarding a range of applying monitoring such as a PDN, a bearer, etc., requiring the monitoring.

The aforementioned information may be added to the context in a new parameter format, or may be used extendedly from a use of the conventional parameter, or may be implicitly reported by using one or more of the conventional parameters. For example, even though the information is not clearly reported, PDN connection information or the like included by default in the context and information predetermined in the MME may be combined to estimate that there is a need to acquire monitoring related information if there is a PDN connection which requires monitoring.

Meanwhile, in addition to the aforementioned information, other information may also be included in the context.

For example, monitoring status information which needs to be continuously checked or recorded may be included in the context. For example, it may be a statistical value accumulatively recorded by a previous serving MME 510. More specifically, for example, if a specific event is monitored for a specific time duration, there may be information regarding how long the monitoring has been carried out. For another example, among information which has not been reported, there may be information on a time at which the specific event is detected lastly or information on a location at which the specific event is detected lastly. For another example, among the information which has not been reported, there may be information on the number of times of occurrence of the specific event.

Meanwhile, if the event to be detected is an event related to a resource used by the MTC device (or allocated to the MTC device or consumed by the MTC device) (e.g., an amount of a packet transmitted by the MTC device or to the MTC device, an amount of data transmitted by the MTC device or to the MTC device, a time consumed when data is transmitted by the MTC device or to the MTC device, the number of times of transmitting data by the MTC device or to the MTC device, the number of times of transmitting a control message (or a signal or an NAS message) by the MTC device or to the MTC device, etc.), there may be information regarding an amount (or size or accumulated value) of resources used up to now by the MTC device.

Upon receiving the minimum information described above, a new entity for performing MTC monitoring, that is, a different MME 510', requests a second different network node other than the previous monitoring entity to send information necessary to perform monitoring (e.g., monitoring event related data and policy information (e.g., indicating a specific event to be detected, a specific period for reporting, etc.)) and acquires related information on the basis of the received information. The acquisition of the information based on the request is not only based on the received information but also based on information that can be additionally acquired, for example, context information related to MTC.

Meanwhile, several nodes (e.g., HSS(Home Subscriber Server)/HLR(Home Location Register), MTC-IWF, SCS/AS, PCRF, or S-GW/P-GW) may be used as the second different network node for providing the necessary information. In this case, various scenarios may exist according to which node is the second different network node for providing the necessary information. Each case will be described hereinafter.

i) First, when the second different network node for providing the necessary information is an HSS/HLR.

The new entity (i.e., serving node) for performing the MTC monitoring, e.g., the different MME 510', may frequently interact with an HSS 540 while performing a procedure such as a location registration or the like with respect to the HSS 540, and may request and receive subscriber information or the like in such a procedure. Accordingly, the different MME 510' may request the HHS 540 to send monitoring event related information and then may acquire it.

ii) When the second different network node for providing the necessary information is an MTC-IWF.

By using a T5 interface defined in 3GPP release 12, the new entity (i.e., serving node) for performing the MTC monitoring, e.g., the different MME 510', may interact with an MTC-IWF 610 to acquire the necessary information. In this case, a message or a procedure or the like defined for device triggering or small data transmission or the like may be used.

iii) When the second different network node for providing the necessary information is an SCS 620 or an application server.

The new entity (i.e., serving node) for performing the MTC monitoring, e.g., the different MME 510', may acquire the information by directly requesting to the SCS 620 or the application server. In this case, as shown in FIG. 6, since there is no direct interface between the MME and the SCS or the application server, a message or a procedure or the like defined for device triggering or small data transmission or the like may be used. Alternatively, the information may be acquired from a third-party server.

iv) When the second different network node for providing the necessary information is a PCRF (Policy and Charging Rule Function).

Similarly to a method of providing a policy rule as in the typical PCC architecture, the new entity (i.e., serving node) for performing the MTC monitoring, e.g., the different MME 510', acquires the information by requesting to the PCRF. In this case, since there is no direct interface between the MME and the PCRF, the information may be acquired via a gateway.

v) When the second different network node for providing the necessary information is an S-GW 520/P-GW 530.

As in the typical PCC architecture, the necessary information, e.g., monitoring event related information, may be acquired from a gateway which plays a role of TDF/BBERF/PCEF, etc., for performing event monitoring or application detection.

A scenario in which the new entity for performing the monitoring acquires the necessary information, e.g., the monitoring event related information, is described above.

Meanwhile, in the aforementioned scenarios, the necessary information may also be acquired only when the new entity for performing the monitoring has a capability of performing monitoring in practice, instead of being acquired unconditionally at the request.

For example, the new entity (or serving node) for performing the monitoring may send capability (or function) information related to monitoring detection by inserting to information (e.g., update location request (ULR) message, etc.,) to be transmitted to the HSS 540. When delivering subscriber information (e.g., update location answer (ULA), etc.), the HSS 540 may deliver the necessary, e.g., monitoring event related information. The monitoring event related information may be delivered together with the existing subscriber information, or only the monitoring related information may be delivered alone without the existing subscriber information. That is, the necessary information, e.g., the monitoring event related information, may be transmitted or not transmitted according to capability (or function) related to monitoring detection, instead of being provided to the new entity (or serving node) for performing the monitoring. The capability (or function) related to monitoring detection corresponds to one or more of cases listed below.

Monitoring detection and report are possible.

An interface T5 may be used for the purpose of monitoring.

A new interface may be used for the purpose of monitoring.

It may be configured such that a next operation (e.g., decrease/restriction and detection or the like for a use of network resources) is performed after the monitoring detection.

It is a situation where a monitoring related operation may be performed (e.g., by considering a network congestion situation or on the basis of predetermined information).

There is an intention to perform a monitoring related operation (e.g., a preference and/or local policy).

In the aforementioned description, it is explained that the necessary information is not acquired unconditionally when it is requested to the HSS 540 but acquired only when the new entity for performing the monitoring has a capability of performing monitoring in practice. In this case, such a concept may be extendedly applied when the necessary information is acquired from a different node other than the HSS 540.

Further, although a case where the necessary information, e.g., monitoring event related information, is maintained in several network nodes is described above, the present invention is not limited thereto. Furthermore, entire necessary information may be acquired from one network node, or may be acquired from several network nodes.

Hereinafter, each step will be described in detail with reference to FIG. 11.

1) The serving MME 510 which is performing a monitoring service for the MTC device 100 is changed to the different MME 510'. Such a change may occur by an attach procedure, a TAU procedure, etc.

2) Then, the different new MME 510' requests the previous serving MME 510 to send a context.

3) The previous serving MME 510 transmits a context response to the different new MME 510'. Only minimum information related to MTC monitoring, e.g., a monitoring indicator, may be included in the context response. Different information other than the indicator may also be included in the context. For example, monitoring status information which needs to be continuously checked or recorded may be included in the context.

4) The different new MME 510' transmits a context reception response, e.g., Context Ack, to the previous serving MME 510.

5) As such, if the new MME 510' receives the context, it may be checked whether it has a capability (or function) for performing monitoring, on the basis of the minimum information included in the context, e.g., the indicator. Further, the different new MME 510' requests the HSS 540 to send necessary information, e.g., monitoring event related data. The request may be transmitted as a single message or a newly defined message, or may be transmitted by using the conventional message, e.g., an update location request (ULR) message. When using the ULR message, it may be reported explicitly or implicitly that the monitoring event related information is requested.

6) The HSS 540 transmits the necessary information, e.g., monitoring event related information, to the different new MME 510'. A message including the necessary information may be a single message or a newly defined message, or may be the conventional message, e.g., an update location ACK (i.e., update location answer (ULA)) message. When using the ULA message, it may be reported explicitly or implicitly that the monitoring event related information is included.

Meanwhile, upon receiving the necessary information, e.g., monitoring event related information, the different new MME 510' may check whether it has a capability (or function) for performing the monitoring.

7) In case of having the capability, the different new MME 510' is configured to monitor an event. Herein, the event may be monitored by the P-GW 530 according to a situation.

8) If the event is detected and collected by being monitored by the MME 510', a report for the collected event data may be transmitted to the MTC-IWF 610.

9) The MTC-IWF 610 checks whether who will receive the report is recorded in subscriber information. If the information is not included in the report received from the MME 510, a query request of the SCS 620 or the application server is transmitted to the HSS 540.

10~11) Upon receiving a query result from the HSS 540, a report on an MTC event is transmitted to the SCS 620 or application server of which the query is checked.

In the example of FIG. 11 above, a scenario in which the serving MME 510 is changed as an entity for monitoring is described. However, the present invention is also applied to a case where a node such as an SGSN/MSC, etc., is changed as the entity for monitoring. In addition, the case where the node is changed may include not only a change between one MME and another MME but also a change between different types of network nodes such as a change of a monitoring entity between an MME and an SGSN.

The content described up to now can be implemented in hardware. This will be described with reference to FIG. 12.

Figure 12:
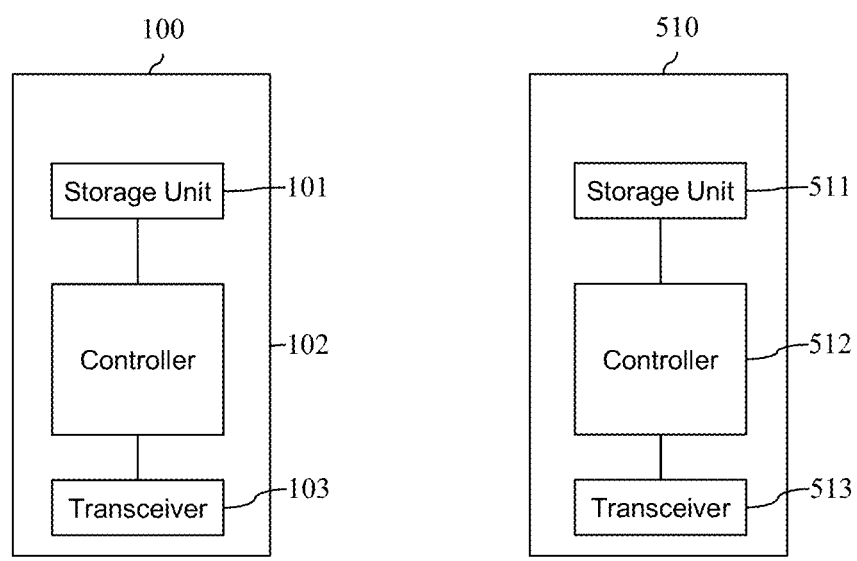
FIG. 12 is a block diagram showing a structure of an MTC device 100 and an MME/SGSN 510 according to an embodiment of the present invention.

FIG. 12 is a Block Diagram Showing a Structure of an MTC Device 100 and an MME/SGSN 510 According to an Embodiment of the Present Invention.

As shown in FIG. 12, the MTC device 100 includes a storage element 101, a controller 102, and a transceiver 103. Further, the MME/SGSN 510 includes a storage element 511, a controller 512, and a transceiver 513.

The storage elements 101 and 511 store the method of FIG. 8 to FIG. 11.

The controllers 102 and 512 control the storage elements 101 and 511 and the transceivers 103 and 513. More specifically, the controllers 102 and 512 respectively execute the aforementioned methods stored in the storage elements 101 and 511. Further, the controllers 102 and 512 transmit the aforementioned signals via the transceivers 103 and 513.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method of performing MTC (Machine Type Communication) monitoring, the method comprising:
    receiving, by a new serving network node to take charge of the MTC monitoring, a partial context instead of a full context from a previous serving network node according to the movement of an MTC device,
    wherein the partial context excludes information other than a part of information required for the MTC monitoring;
    checking whether an indicator related to another network entity for the MTC monitoring is included in the part of information of the partial context; and
    if the MTC device moves at a speed lower than a predetermined speed, requesting for data necessary to perform the MTC monitoring from the another network entity other than the previous serving network node on the basis of the indicator for the MTC monitoring.

2. The method of claim 1, further comprising:
    checking whether there is a capability for performing the required MTC monitoring, on the basis of the indicator included in the part of information of the partial context and regarding the MTC monitoring.

3. The method of claim 2, wherein the capability for performing the MTC monitoring comprises a supporting capability of an interface T5b.

4. The method of claim 1, wherein the part of information of the partial context comprises one or more of:
    information regarding a monitoring progression status;
    a direct instruction for acquiring monitoring event related information;
    information related to the new serving network node capable of acquiring monitoring event related information; and
    information regarding a range of applying the monitoring.

5. The method of claim 1, wherein if the monitoring is related to an accumulated statistical value, the part of information of the partial context comprises a statistical value accumulated by the previous serving network node.

6. The method of claim 5, wherein the accumulated statistical value comprises one or more of:
    information regarding how long the monitoring has been carried out if a specific event is monitored for a specific time duration;
    information on a time at which the specific event is detected lastly or information on a location at which the specific event is detected lastly among information which has not been reported; and
    information on the number of times of occurrence of the specific event among the information which has not been reported.

7. The method of claim 1, wherein the data necessary to perform the MTC monitoring comprises one or more of a field for configuring, activating, deactivating, or triggering a report delivery regarding a specific monitoring event, a monitoring event ID, a related parameter, a monitoring event priority, and a monitoring destination node.

8. The method of claim 1, wherein the network nodes correspond to one or more of an MME (Mobility Management Entity) and an SGSN (Serving GPRS Support Node).

9. The method of claim 1, wherein the another network entity is an HSS (Home Subscriber Server), an HLR (Home Location Register), an SCS (Service Capability Sever), or an application server.

10. The method of claim 1, wherein the partial context is received during any one of a TAU (Tracking Area Update) procedure, an RAU (Routing Area Update) procedure, and an attach procedure is performed.

11. An MTC (Machine Type Communication) monitoring network node comprising:
   a transceiver configured to receive a partial context instead of a full context from a previous serving network node for monitoring related to an MTC device,
   wherein the partial context excludes information other than a part of information required for the MTC monitoring; and
   a processor configured to check whether an indicator related to another network entity for the MTC monitoring is included in the part of information of the partial context,
   wherein if the MTC device moves at a speed lower than a predetermined speed, the processor requests for data necessary to perform the MTC monitoring from the another network entity other than the previous serving network node on the basis of the indicator for the MTC monitoring.

12. The MTC monitoring network node of claim 11, wherein the processor checks whether there is a capability for performing the required MTC monitoring, on the basis of the indicator included in the part of information of the partial context and regarding the MTC monitoring.

13. The MTC monitoring network node of claim 11, wherein the part of information of the partial context comprises one or more of:
   information regarding a monitoring progression status;
   a direct instruction for acquiring monitoring event related information;
   information related to the new serving network node capable of acquiring monitoring event related information; and
   information regarding a range of applying the monitoring.

14. The MTC monitoring network node of claim 11, wherein if the monitoring is related to an accumulated statistical value, the part of information of the partial context comprises a statistical value accumulated by the previous serving network node.

15. The MTC monitoring network node of claim 11, wherein the data necessary to perform the MTC monitoring comprises one or more of a field for configuring, activating, deactivating, or triggering a report delivery regarding a specific monitoring event, a monitoring event ID, a related parameter, a monitoring event priority, and a monitoring destination node.

* * * * *